United States Patent
Centa et al.

(10) Patent No.: US 6,175,213 B1
(45) Date of Patent: Jan. 16, 2001

(54) SAFETY DEVICE FOR LITHIUM-ION-POLYMER BATTERY

(75) Inventors: John A. Centa, Concord Township; Frough K. Shokoohi, Kirtland, both of OH (US)

(73) Assignee: NTK Powerdex, Inc., Eastlake, OH (US)

( * ) Notice: Under 35 U.S.C. 154(b), the term of this patent shall be extended for 0 days.

(21) Appl. No.: 09/506,912

(22) Filed: Feb. 18, 2000

(51) Int. Cl.[7] .................................................. H02J 7/00
(52) U.S. Cl. ................................................................ 320/112
(58) Field of Search ............................................. 320/112

(56) References Cited

U.S. PATENT DOCUMENTS 5,656,355 * 8/1997 Cohen .................................. 428/138

* cited by examiner

Primary Examiner—Peter S. Wong
Assistant Examiner—Pia Tibbits
(74) Attorney, Agent, or Firm—Mark Kusner

(57) ABSTRACT

A battery is comprised of a rigid, plastic housing defining a generally rectangular interior cavity, and an essentially flat interior surface. A battery rechargeable electric cell has a flexible outer packaging, an electrically conductive thermoset adhesive film, and is contained within the cavity. The cell is generally rectangular in shape and has a flat outer surface and two leads extending through the housing. The cell has a normal configuration when experiencing normal operating conditions, and an abnormal configuration when experiencing abnormal operating conditions. A membrane switch is disposed between the flat interior surface of the housing and the flat outer surface of the cell. The switch has at least one lead extending through the housing. The switch has a first electrical condition when the cell has the normal configuration and a second electrical condition when the cell has the abnormal configuration. The membrane switch is selected to have a predetermined operating pressure related to the battery size and shape.

14 Claims, 3 Drawing Sheets

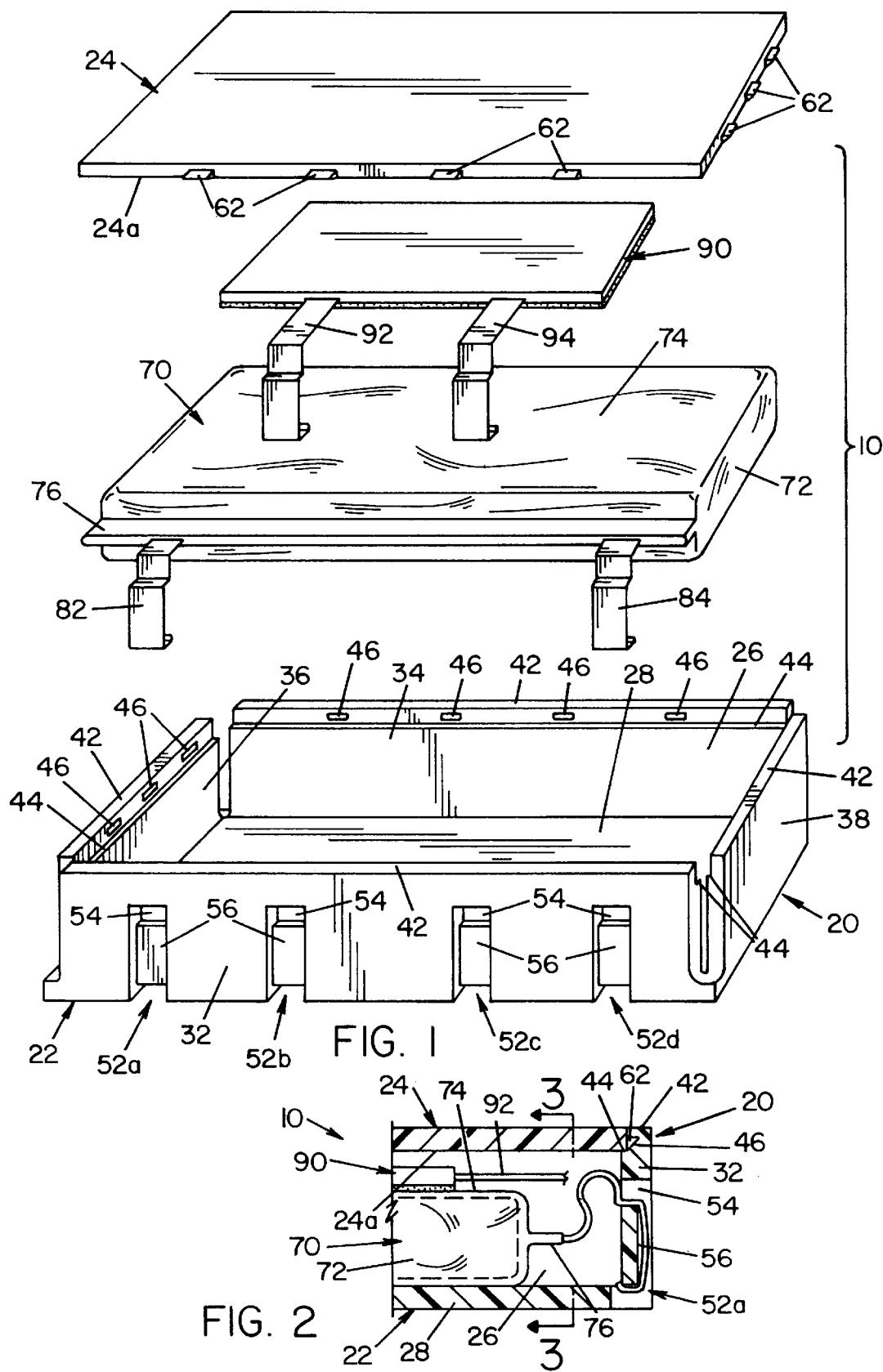

SAFETY DEVICE FOR LITHIUM-ION-POLYMER BATTERY

FIELD OF THE INVENTION

The present invention relates generally to batteries, more particularly to a safety device for a thin lithium-ion battery.

BACKGROUND OF THE INVENTION

Improvements in micro-electronics have increased the demand for electrolytic cells in batteries that can be directly incorporated into electronic devices so as to produce a portable finished package, such as for example a cellular phone or a lap top computer. As improvements in micro-electronics reduce the size of the electronic device, the space allotted to a power supply within such device has likewise decreased. It is therefore important to maximize the power per unit space that a battery cell can provide.

When extremely thin or unusually shaped batteries are required, cells contained within flexible packaging have found advantages application. A cell contained within a flexible laminate package provides more efficient use of the space available within a device, in that the cell and package can assume a variety of shapes allowing the battery design to accommodate the space restrictions within the device.

A problem with cells contained within flexible packaging is that they are sensitive to temperature and over-voltage or over-current conditions. In this respect, cells within flexible packages tend to "gas-up" or "swell-up" under extreme temperatures or under extreme over-voltage or over-current conditions. Excessive heat, current or voltage can cause the liquid electrolyte within the cell to decompose into a combustible gaseous by-product. Internal pressures created by this buildup of gas may cause the flexible packaging to swell and even rupture. Still further, without a liquid electrolyte within the cell, the electrodes become resistive elements and energy provided thereto (for example by a battery charger) is converted to heat. If the electrode temperatures exceed the flash point of the hydrocarbon gases generated within the cell, the flexible packaging may rupture. While flexible packaging is less susceptible to a violent venting or catastrophic failure as compared to rigid metal or plastic containers, ruptures of the flexible packaging can damage electronic equipment in the vicinity of the cell.

The present invention overcomes this and other problems and provides a lithium ion battery having a current interrupt safety feature to prevent catastrophic failure with flexible packaging.

SUMMARY OF THE INVENTION

In accordance with a preferred embodiment of the present invention, there is provided a battery comprised of a rigid, plastic housing defining a generally rectangular cavity. The housing has an intentionally flat surface and a plurality of openings extending from the cavity through the housing. A rechargeable electric cell having a flexible outer package is contained within the cavity of the housing. The cell is generally rectangular in shape and has a flat outer surface and two leads. The leads extend from the cell through select ones of the plurality of openings through the housing. The cell has a normal configuration when experiencing normal operating conditions and an abnormal configuration when experiencing abnormal operating conditions. A flat planar switch is disposed between the flat interior surface of the housing and the flat outer surface of the cell. The switch has at least one switch lead extending therefrom through another of the plurality of openings through the housing. The switch has a first electrical condition when the cell has a normal configuration and a second electrical condition when the cell has an abnormal configuration.

In accordance with another aspect of the present invention, there is provided a battery pack comprised of a rigid housing, and a rechargeable electric cell contained within the housing. The cell has a flexible outer packaging that maintains a normal configuration when experiencing normal operating conditions and an abnormal configuration when experiencing abnormal operating conditions. The cell has a negative lead and a positive lead that are electrically connected to external contacts on the housing. The contacts are adapted to engage contacts on a load or an electrical charging device. An electrical circuit within the housing is connected across the positive lead and the negative lead. The circuit includes a switch element disposed between an interior surface of the housing and an external surface of the cell. The switch element has a normally open switch position when the cell is in the normal configuration and a closed switch position when the cell is in the abnormal condition. The circuit also includes a breaking device having a first closed position connecting the positive lead to a respective one of the external contacts when the switch element is in the normally open switch position, and a second open position breaking the electrical connection between the positive lead and the respective one of the external contacts when the switch element is in the closed switch position.

It is an object of the present invention to provide a rechargeable battery pack for use in an electronic device that includes a safety device to protect the battery from abnormal operation due to a fault condition.

Another object of the present invention is to provide a rechargeable battery pack as described above that is comprised of a housing containing an electrical cell having a flexible outer package and a switch mechanism operable to sense abnormal operating conditions.

Another object of the present invention is to provide a rechargeable battery pack as described above wherein the cell is contained within a flexible outer package and the switch mechanism is disposed within the housing between the cell and the housing.

A still further object of the present invention is to provide a rechargeable battery pack as defined above including electrical circuitry to prevent the cell from experiencing abnormal operating conditions and to prevent damage to circuits and components external to the battery pack.

These and other objects and advantages will become apparent from the following description of a preferred embodiment of the invention, taken together with the accompanying drawings.

BRIEF DESCRIPTION OF THE DRAWINGS

The invention may take physical form in certain parts and arrangement of parts, embodiments of which are described in detail in the specification and illustrated in the accompanying drawings, wherein;

FIG. 1 is an exploded view of a rechargeable battery pack, illustrating a preferred embodiment of the present invention;

FIG. 2 is a sectioned, elevational view of a proportion of the battery pack shown in FIG. 1 showing an electrical contact on the battery pack;

DETAILED DESCRIPTION OF PREFERRED EMBODIMENT

Figure 3:
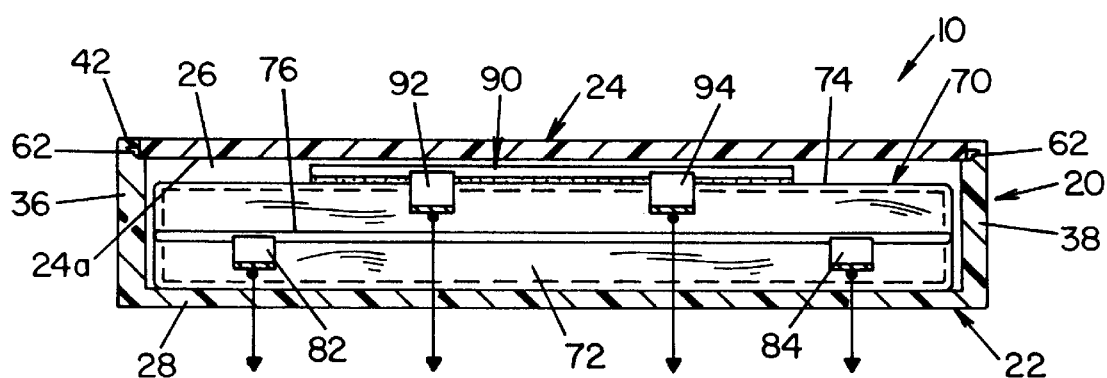
FIG. 3 is a sectional view taken along lines 3—3 of FIG. 2 showing the configuration of the battery pack of FIG. 1 under normal operating conditions.

Referring now to the drawings wherein the showings are for the purpose of illustrating the preferred embodiment of the invention only, and not for the purpose of limiting same, FIG. 1 shows, in exploded view, a battery pack 10 illustrating a preferred embodiment of the present invention. Broadly stated, battery pack 10 is comprised of a housing 20, a battery 70 and a switch 90.

Housing 20 is comprised of a lower housing section 22 and an upper housing section 24. Housing sections 22. 24 together define an inner cavity 26 that is dimensioned to receive electrical cell 70. Lower housing section 22 is comprised of a generally planar bottom wall 28, side walls 32, 34 and end walls 36, 38. The upper ends of side walls 32, 34 and end walls 36, 38 are undercut to define a lip 42 and a ledge 44. A plurality of spaced apart recesses 46 are formed within ledges 44 of side walls 32, 34 and end walls 36, 38. In the embodiment shown, four contact slots, designated 52a, 52b, 52c, and 52d are formed in side wall 32. Each contact slot 52a, 52b, 52c and 52d includes an opening 54, that extends through side wall 32 and communicates with cavity 26, and a contact mounting plate 56.

Upper housing section 24 is generally rectangular in shape and is dimensioned to rest upon ledges 44 of side walls 32, 34 and end walls 36, 38, as best illustrated in FIG. 2. Upper housing section 24 includes a plurality of spaced apart tabs 62 that are dimensioned to be in registry with recesses 46 in lips 42 of side walls 32, 34 and end walls 36, 38. As seen in FIGS. 1 and 2, tabs 62 are generally wedge shaped and are operable to snap-lock into recesses 46 to secure upper housing section 24 to lower housing section 22.

Battery 70 is generally comprised of a lithium ion cell (not shown) contained within a flexible package 72. The cell is generally comprised of flat electrodes (anode, separator and cathode) and a liquid electrolyte. The composition of the lithium ion cell in and of itself forms no part of the present invention. Packaging 72 is generally formed from a laminate comprised of one or more layers of metallic foil and/or one or more layers of a polymer material (not shown). The composition and make-up of the laminate in and of itself forms no part of the present invention. Packaging 72 is generally sealed by means of pressure and heat to form a seam 76 along one edge thereof. A pair of conductive leads 82, 84 extends from battery 70. As best seen in FIG. 2, leads 82, 84 are formed to include a generally C-shaped portion. The C-shaped portion of leads 82, 84 are dimensioned to extend through opening 54 in side wall 32, and to snap-lock onto contact mounting plate 56. As best illustrated in FIG. 2, a portion of each lead 82, 84 is exposed at contact mounting slots 56a and 56d, respectively.

Figure 4:
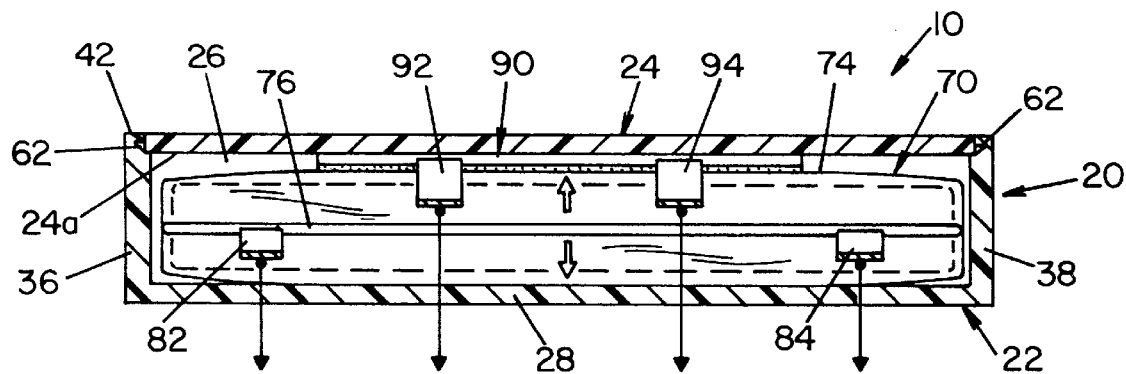
FIG. 4 is a sectional view showing the configuration of the battery pack of FIG. 1 under abnormal operating conditions.

In the embodiment shown, planar switch 90 is a thin, flat, sheet-like device having leads 92 and 94 extending from one edge thereof. Like leads 82, 84 of battery 70, leads 92, 94 include a generally C-shaped portion dimensioned to extend through openings 54 in contact slots 52b and 52c and to snap onto contact mounting plates 56. In accordance with a preferred embodiment of the present invention, switch 90 is a membrane switch having two switch conditions. Switch 90 is disposed between generally planar surface 74 of cell 70 and interior surface 24a of upper housing section 24, as best seen in FIGS. 3 and 4.

Membrane switch 90 is selected to have a predetermined operating pressure related to the size and shape of battery 70. In this respect, membrane switches are available in a variety of shapes and actuation pressures, and can essentially be formed to conform to any desired topology. In the context of the present invention, it is only important that the actuation force of the membrane switch be sized relative to the battery with which it is used.

Switch 90 preferably has a first operating condition wherein switch 90 is in a normal, "open" position, and a second operating condition wherein switch 90 is in a "closed" position when the "actuation force" of the switch has been attained.

As shown in FIG. 1, battery 70 and switch 90 are disposed within cavity 26 of housing 20. Electrical leads 82, 84 of battery 70 extend through openings 54 of contact slots 52a and 52d, and leads 92, 94 of switch 90 extend through openings 54 of contact slots 52b and 52c. With cell 70 and switch 90 in position in cavity 26, upper housing section 24 is snap-locked onto lower housing section 22 to form battery pack 10, best seen in cross-section in FIGS. 3 and 4. Battery pack 10 thus provides an electrical battery 70 and a safety device 90 enclosed within a compact housing 20. Leads 82, 84 of battery 70, as well as leads 92, 94 of switch 90, are exposed on the outer surface of side wall 32 for operative engagement with opposing contacts of an electrical device, or opposing contacts in a battery charger.

Referring now to the operation of battery pack 10, housing 20 is dimensioned to fit within an opening of an electronic device (not shown), or within an opening or slot within a battery charger (not shown). Leads 82, 84 of battery 70 are positioned to engage corresponding power leads of the electronic device or battery charger. Leads 92, 94 from switch 90 are positioned to engage corresponding leads from a circuit (not shown) within the electronic device or battery charger. The circuit is preferably adapted to break the electrical connection between battery pack 10 if switch 90 changes from its first condition to its second condition. The circuit may also provide an "indication" of the switch condition, such as for example, by conveying a signal to an audible, visual or other electrical device.

When in place in an electronic device or battery charger, battery 70 maintains a generally planar, "normal configuration", as illustrated in FIG. 3, under normal operating conditions. In the event of an over-current or over-voltage situation, or a condition where battery pack 10 experiences extreme, elevated temperature conditions, the liquid electrolyte in battery 70 may begin to decompose into some combustible gaseous by-product, thereby causing flexible packaging 72 to swell, as illustrated in FIG. 4. The swelling of package 72 compresses membrane switch 90 against upper housing section 24. When the actuation pressure of membrane switch 90 is reached, membrane switch 90 switches from its first (open) condition to its second (closed) condition, thereby providing an electrical signal to the external circuit to break the electrical connection between battery pack 10 and the electronic device or battery charger. The present invention thus provides a safety device (i.e., switch 90) within battery pack 10 to prevent catastrophic failure of battery 70, that may result from an over-voltage or over-current condition.

Figure 5:
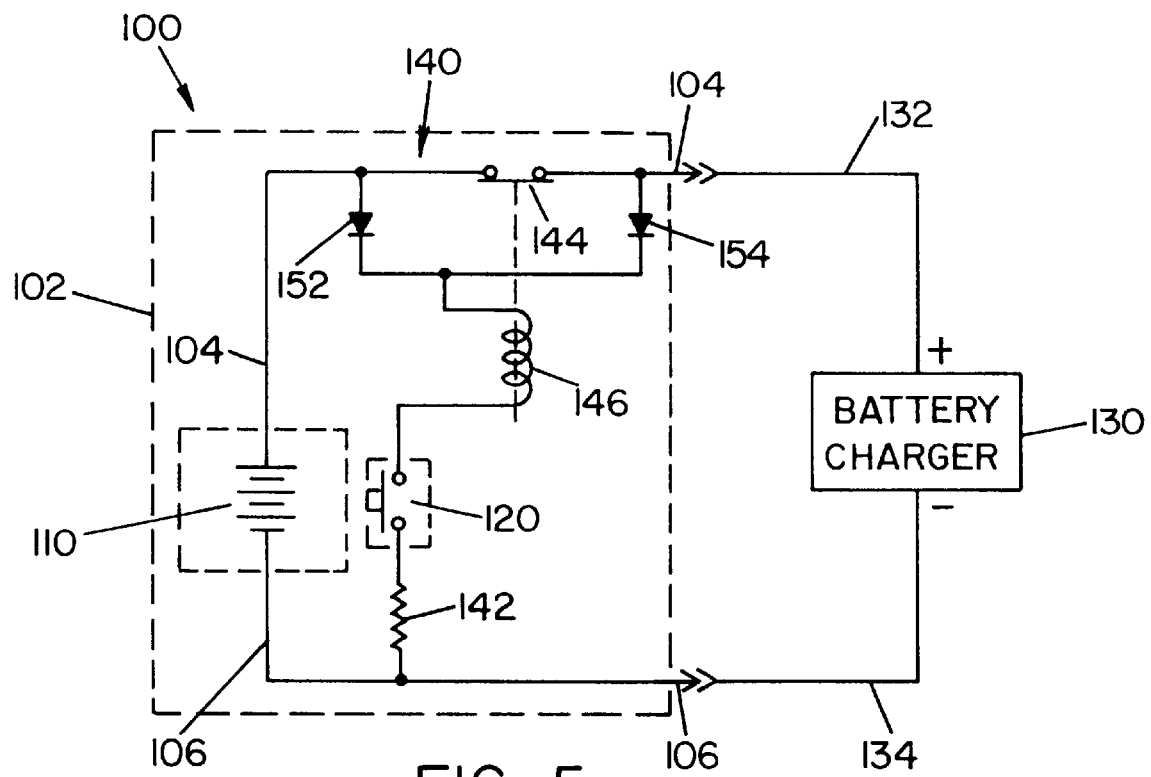
FIG. 5 is a schematic view of the battery pack of the type disclosed in FIG. 1 that also includes internal circuitry to prevent damage to external components and circuitry, illustrating another embodiment of the present invention.

Referring now to FIG. 5, a battery pack 100, schematically illustrating an alternate embodiment of the present invention, is shown. Battery pack 100 is comprised of a housing 102, an electrical battery 110, a switch 120 and a circuit 140. Housing 102, battery 110 and switch 120 are preferably similar to those previously described with respect to battery pack 10. In this respect, housing 102 would be a two-piece structure containing a battery 110 having flexible outer packaging as previously described. Switch 120 is a membrane switch of the type previously described, and is disposed between a surface of battery 110 and a surface of housing 102.

Figure 6:
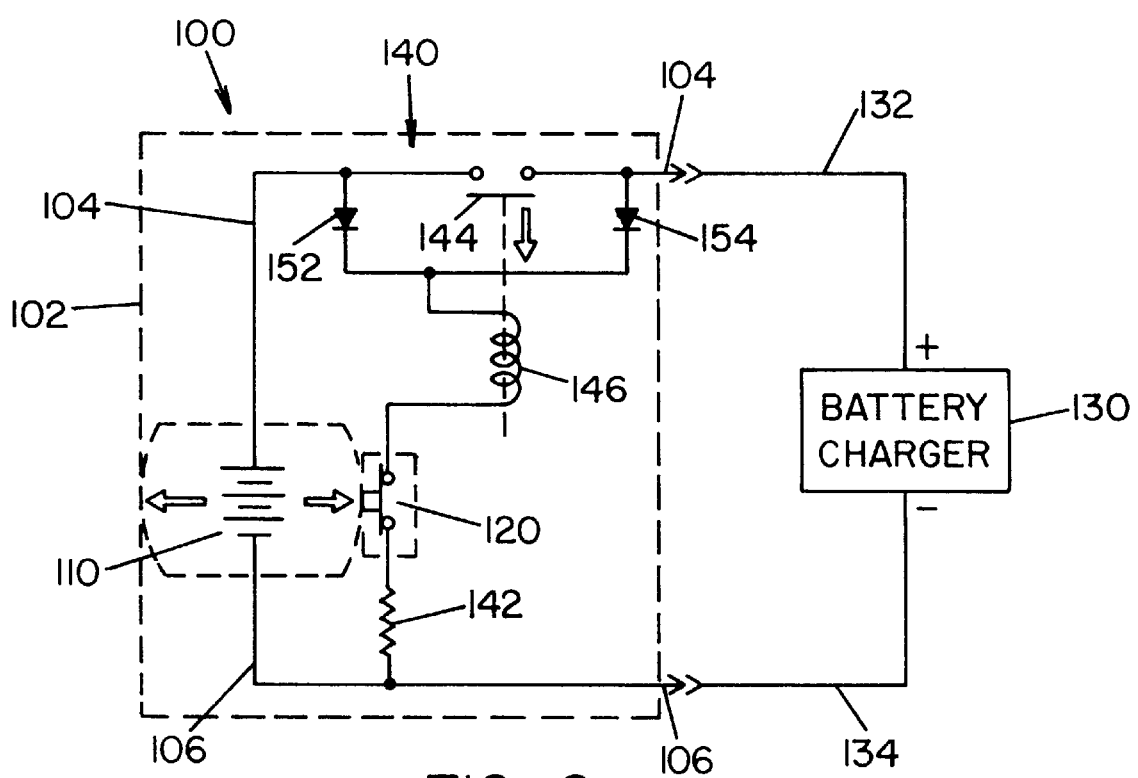
FIG. 6 is a sectional view of the battery pack shown in FIG. 5 schematically showing the operation of the internal circuitry under a fault condition.

Leads 104, 106 extend from battery 110 and include a portion that extends outside housing 102. In FIGS. 5 and 6 battery pack 100 is shown connected to a battery charger 130 having leads 132, 134. Battery charger lead 132 is connected to battery pack lead 104 and a battery charger lead 134 connected to a battery pack 106.

In accordance with one aspect of the present invention, circuit 140 is contained within housing 102, and is adapted to prevent catastrophic failure of cell 110. Circuit 140 includes a resistive element 142 and a contact 144 that is controlled by a solenoid 146. Resistive element 142 is connected in series to switch 120 that is in turn connected in series to solenoid 146. A pair of diodes 152, 154 are connected in parallel across switch 144 and are together connected in series to solenoid 146.

FIG. 5 shows battery pack 100 in a normal operating condition wherein cell 110 has a normal configuration, and membrane switch 120 is in an open position (i.e., its first, normal position). In this state, battery charger 130 is operable to charge battery 110 as lead 104 from battery pack 100 is connected to lead 132 of battery charger 130 and lead 106 of battery pack 100 is connected to lead 134 of battery charger 130. In the event of some over-voltage or over-current condition, cell 110 will begin to swell (as described above) thereby causing membrane switch 120 to close and complete circuit 140 between lead 104 and 106. Specifically, a conductive path is found through resistive element 142, membrane switch 120 and diode 154. Upon energization of solenoid 146, contact 144 moves from its original closed position to a position breaking the circuit between cell 110 and battery charger 130. Battery charger 130 nevertheless still senses the load of resistive element 142 as a circuit from battery charger 130 through diode 154, solenoid 146, switch 120, resistive element 142 and leads 106, 134 is created. Diode 152 prevents current flow to cell 110.

FIGS. 5 and 6 thus illustrate how a simple circuit may be provided within battery pack 100 so as to prevent catastrophic failure of cell 110, and at the same time, prevent damage to external circuits and components, such as battery charger 130, by providing a resistive circuit path.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A battery, comprised of:
    a rigid, plastic housing defining an interior cavity, said housing having an essentially flat interior surface and a plurality of openings extending from said cavity through said housing;
    a rechargeable electric cell having a flexible outer packaging, said cell contained within said cavity and having a flat outer surface and two leads, said leads extending from said cell through select ones of said plurality of openings through said housing, said cell having a normal configuration when experiencing normal operating conditions and an abnormal configuration when experiencing abnormal operating conditions; and
    a switch disposed between said flat interior surface of said housing and said flat outer surface of said cell, said switch having at least one lead extending therefrom through another of said plurality of openings through said housing, said switch having a first electrical condition when said cell has said normal configuration and a second electrical condition when said cell has said abnormal configuration.

2. A battery as defined in claim 1 wherein said switch is a membrane switch.

3. A battery as defined in claim 2 wherein said first electrical condition is an open switch position and said second electrical condition is a closed switch position.

4. A battery as defined in claim 3 wherein said cell is a Li-ion battery and said flexible packaging is a multi-layer laminate.

5. A battery as defined in claim 4 wherein said abnormal configuration exists when gas forms within said flexible packaging causing said flexible packaging to swell.

6. A battery pack, comprised of:
    a rigid housing;
    a rechargeable electric cell contained within said housing, said cell having a flexible outer packaging that maintains a normal configuration when experiencing normal operating conditions and an abnormal configuration when experiencing abnormal operating conditions, said cell having a negative lead and a positive lead, said leads electrically connected to external contacts on said housing, said contacts adapted to engage contacts on a load or an electrical charging device and an electrical circuit within said housing connected across said positive lead and said negative lead, said circuit including:
    a) a switch element disposed between an interior surface of said housing and an external surface of said cell, said switch element having a normally open switch position when said cell is in said normal configuration and a closed switch position when said cell is in said abnormal condition; and
    b) a circuit breaking device having a first closed position connecting said positive lead to a respective one of said external contacts when said switch element is in said normally open switch position, and a second open position breaking the electrical connection between said positive lead and said respective one of said external contacts when said switch element is in said closed switch position.

7. A battery pack as defined in claim 6 wherein said electrical circuit forms an electrical path across said two external contacts when said switch element is in said closed position.

8. A battery pack as defined in claim 7 wherein said electrical path includes a resistive element connected to said negative lead, said resistive element being connected in series with said switch element, a solenoid and a pair of parallel diodes, said diodes connected to said positive lead.

9. A battery pack as defined in claim 8 wherein said solenoid operates a contact connecting said positive lead to a respective one of said external contacts, and said diodes are connected across said contact, one of said diodes connected to said positive lead and another of said diodes connected to said respective one of said external contacts.

10. A battery pack as defined in claim 7 wherein said electrical circuit includes a resistive element.

11. A battery pack as defined in claim 10 wherein said circuit breaking device is connected in series with said switch element.

12. A battery pack as defined in claim 10 wherein said circuit breaking device is a solenoid-operated contact.

13. A battery pack as defined in claim 12 wherein said electrical circuit includes a pair of diodes connected in parallel across said contact.

14. A battery pack as defined in claim 13 wherein said pair of diodes are connected in series with said solenoid.

* * * * *